United States Patent [19]
Schauer et al.

[11] Patent Number: 5,348,490
[45] Date of Patent: Sep. 20, 1994

[54] DEVICE FOR TRANSFERRING CURRENT BETWEEN TWO END POINTS

[75] Inventors: Friedrich Schauer, Heroldsberg; Andreas Neuner, Nürnberg, both of Fed. Rep. of Germany

[73] Assignee: Kabelmetal Electro Gesellschaft mit beschränkter Haftung, Hanover, Fed. Rep. of Germany

[21] Appl. No.: 183,103

[22] Filed: Jan. 14, 1994

Related U.S. Application Data

[63] Continuation of Ser. No. 957,735, Oct. 7, 1992, abandoned.

[30] Foreign Application Priority Data

Oct. 7, 1991 [DE] Fed. Rep. of Germany ....... 4133172

[51] Int. Cl.$^5$ .................... H01R 13/58; H01R 35/02
[52] U.S. Cl. .................................. 439/164; 439/467
[58] Field of Search .......... 439/15, 164, 459, 465–467

[56] References Cited

U.S. PATENT DOCUMENTS

| | | | |
|---|---|---|---|
| 3,336,565 | 8/1967 | Crimmins | 439/467 |
| 3,559,813 | 2/1971 | Sosinski | 439/716 |
| 3,601,768 | 8/1971 | Lightner | 439/459 |
| 4,413,872 | 11/1983 | Rudy, Jr. et al. | 439/467 |
| 4,759,723 | 7/1988 | Siemon | 439/467 |
| 5,149,273 | 9/1992 | Bannai et al. | 439/15 |

FOREIGN PATENT DOCUMENTS

| | | |
|---|---|---|
| 0425846 | 5/1991 | European Pat. Off. |
| 2854903 | 7/1979 | Fed. Rep. of Germany ...... 439/459 |
| 8914423 | 2/1990 | Fed. Rep. of Germany |
| 2071926 | 9/1981 | United Kingdom |

*Primary Examiner*—Gary F. Paumen
*Attorney, Agent, or Firm*—Martin A. Farber

[57] ABSTRACT

A device for transferring current between two end points between which a ribbon cable (10) extends, the ribbon cable serving for an electric connection and being contained in a cassette in coiled form, the cable having at least two electric wires. Plug pins (12) are connected to bared wires of the ribbon cable (10), the pins being arranged in a prefabricated housing (G) of insulating material. The housing (G) consists of a base body (16) and a cover (17) which are locked to each other in the closed position of the housing (G). Projections (19) are arranged on the cover (17), the projections resting firmly against the plug pins (12) in order to fix the position of the plug pins in a closed position of the housing (G). The ribbon cable (10) is passed through a separating joint (T) disposed between the cover (17) and the base body (16), and is clamped therein in the closed position of the housing (G).

7 Claims, 2 Drawing Sheets

DEVICE FOR TRANSFERRING CURRENT BETWEEN TWO END POINTS

RELATED APPLICATION

This application is a continuation of our co-pending application Ser. No. 07/957,735 filed: Oct. 7, 1992, now abandoned.

FIELD AND BACKGROUND OF THE INVENTION

The present invention relates to a device for transferring current between two end points between which a ribbon cable extends, wherein the ribbon cable serves for an electrical connection and is contained in a cassette in coiled form. The cable has at least two electric wires the length of which is substantially greater than the distance between the two end points. At least one of the two end points is movable relative to the other. Plugs are connected in electrically conductive manner to the bared wires of the ribbon cable at at least one end, the plugs being arranged in a prefabricated housing of insulating material which is provided on one end with an opening to receive mating contacts such a device being disclosed in German Utility Model 89 14 423.

Apparatus having such devices comprise, for instance, winders in which an electric cable is wound on a reel. The cable can be pulled out of the housing of the apparatus and automatically rolled up again under the action of a spring after the cessation of a pulling force. This apparatus can also be employed for the feeding of current for crash protection in motor vehicles in which an electric cable is arranged in the steering wheel of a vehicle. One essential problem with these apparatus is the transfer of current between stationary and movable parts. This problem is present in all apparatus in which there are two end points which are movable relative to each other, one of them in most cases being developed as a fixed point. The wiper contacts or wiper rings, known for a long time for use in such cases, are subject to wear and are disadvantageous particularly in the case of low current intensities due to varying contact resistances.

In the known device in accordance with the aforementioned German Utility Model 89 14 423, the transfer of current takes place by the ribbon cable which is wound, for instance, in the manner of a spring barrel. Upon a turning relative to each other of the two end points which are connected by the ribbon cable, the wound ribbon cable "breathes" like the spring of a watch. The turns are contracted to a small diameter in one direction of rotation. In the other direction of rotation they return to a larger diameter. By the application of the plugs to at least one end of the ribbon cable, extension cables equipped with corresponding mating contacts can easily be attached. Upon a placing of mating contacts on the connecting plugs and their removal from them, forces which act particularly in axial direction are exerted on the plugs. As a result, the connecting places between the wires of the ribbon cable and the plug pins can be subjected to load and possibly damaged. No measures by which this can be avoided are indicated in the aforementioned German Utility Model 89 14 423.

SUMMARY OF THE INVENTION

It is an object of the present invention so further to develop the abovementioned device that the places of connection between the wires of the ribbon cable and the plug pins are effectively protected against mechanical forces acting in axial direction.

According to the invention the housing (G) consists of a base body (16) and a cover (17) which are locked to each other in the closed position of the housing (G);

projections (19) provided on the cover (17) serve for fixing the position of the plug pins (12) and press firmly against the housing (G) in the closed position of the latter; and the ribbon cable (10) is passed through a separating joint (T) remaining between the base body and the cover (17) and is clamped therein in the closed position of the housing (G).

In the housing of this device, the plug pins are protected in both axial directions, from pulling or pushing forces acting on them or on the connected ribbon cable. This result is obtained, on the one hand, by the projections on the cover and, on the other hand, by the clamping of the ribbon cable in the housing. The projections on the cover lie firmly against the plug pins in the closed position of the housing. In this way, they protect the pins, for instance, against displacements within the housing which could occur upon a placing on and pulling off of mating contacts. Since the ribbon cable is firmly clamped in the separating joint between base body and cover in the closed position of the housing, pulling forces which act on the ribbon cable cannot be transmitted to the points of connection between the wires of the ribbon cable and the plug pins. The plug pins are thus effectively relieved from strain on this side.

The invention also provides that the base body (16) and the cover (17) of the housing (G) are attached to each other by a film hinge (18).

Further according to the invention, the ribbon cable (10) is bent at least two times in the separating joint (T) between the base body (16) and the cover (17) of the housing (G).

Moreover, the invention provides that the plug pins (12) have extensions (23) against which the projections (19) of the cover (17) rest.

Another feature of the invention is that there are openings (21, 22) through which the connecting points (13) between the wires (11) of the ribbon cable (10) and the plug pins (12) are accessible, the openings being provided in the housing (G).

Still further, according to the invention, the housing (G) is arranged in a receiver (15) which is firmly attached to the cassette (K).

Yet according to a feature of the invention, the housing (G) is engaged under spring action in the receiver (15).

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
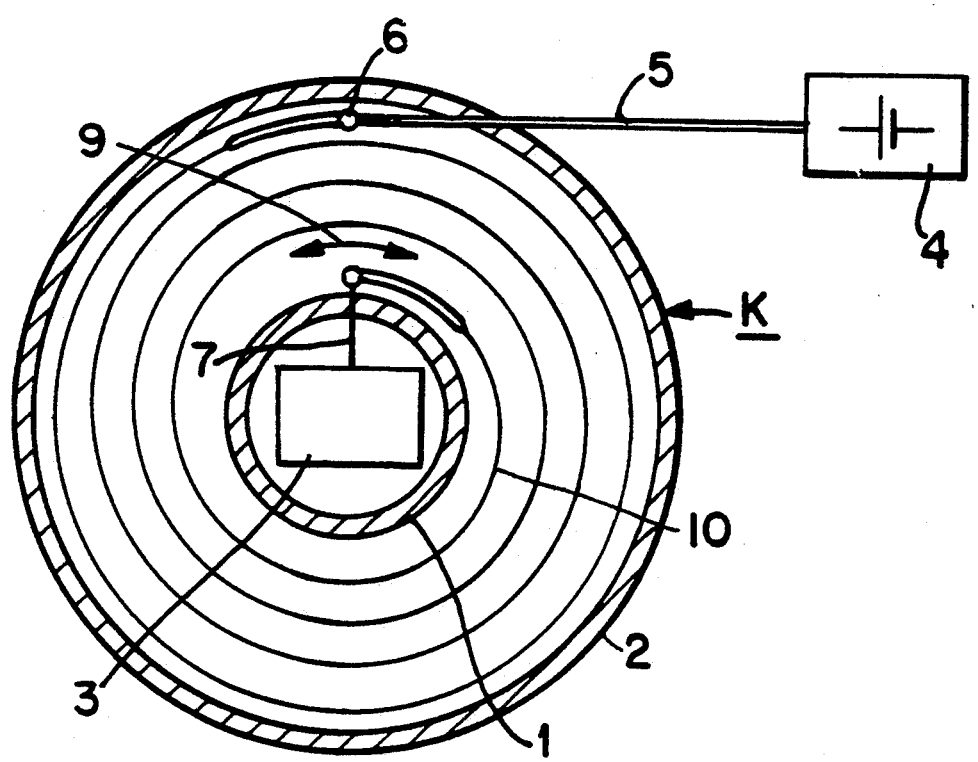
FIG. 1 is a diagrammatic cross section through a cassette having a device in accordance with the invention.

FIG. 1 diagrammatically shows two walls 1 and 2, developed, for instance, in circular shape, of a cassette K of an electric apparatus. This apparatus can, for instance, be a control device installed in the steering wheel of a motor vehicle. For supplying current to an electronic system 3 of this device, the device is connected to the battery 4 of a motor vehicle. The battery 4 is connected by an electric cable 5 to an end point 6 developed as fixed point. The electronic system 3 is connected by an electric cable 7 to an end point 8 which is movable in the direction indicated by the double-ended arrow 9.

A ribbon cable 10 having at least two wires 11 (FIG. 2) is arranged between the two end points 6 and 8. The wires 11 are preferably developed as flat wires. This embodiment of the ribbon cable 10 is particularly thin and therefore takes up very little space. However, in principle, the ribbon cable 10 could also have round wires. In the embodiment shown in FIG. 2, the cable 10 has the two flat wires 11 to which plug pins 12 are, for instance, soldered or welded. Connecting points between wires 11 and plug pins 12 are designated 13.

In accordance with FIG. 1, the ribbon cable 10 can be arranged in several turns between the two end points 6 and 8 and, therefore, in the manner of a watch spring barrel. Although the number of turns of a steering wheel is limited to about six, more than six windings are to be provided for the ribbon cable 10. The turning movement of the end point 8 is then substantially imperceptible to an individual winding of the ribbon cable 10. The diameter of the package consisting of all windings of the ribbon cable 10 may be reduced or increased in size.

Figure 2:
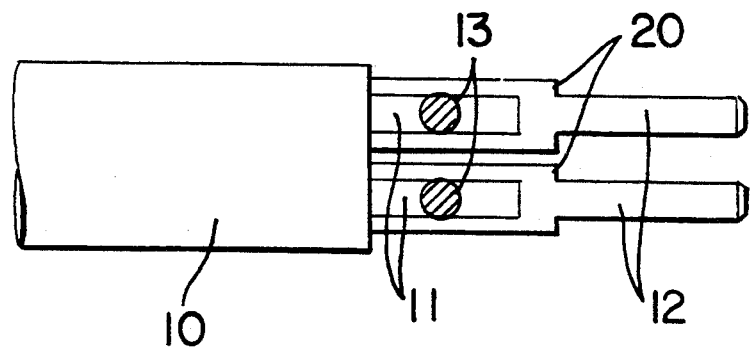
FIG. 2 shows the end of a ribbon cable with connected plug pins on a larger scale.
Figure 4:
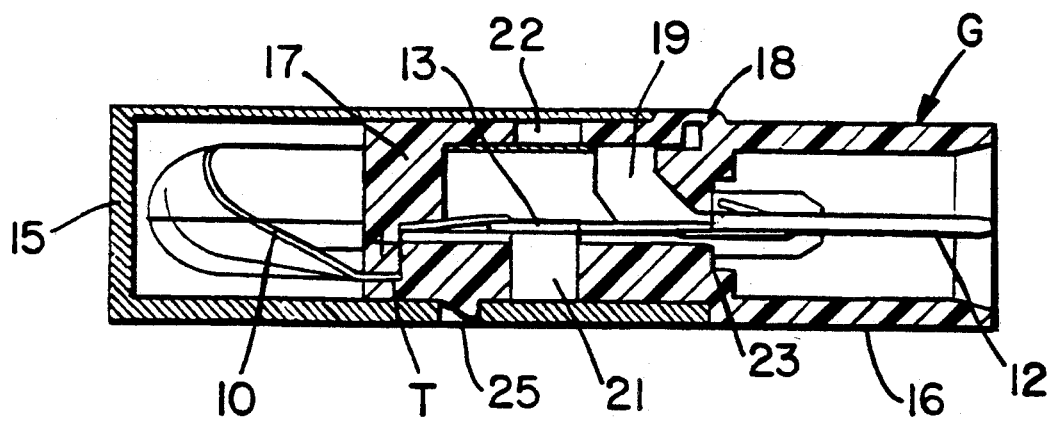
FIG. 4 is a cross section on a larger scale through a plug connection inserted in the device.

The end of the ribbon cable 10 visible in FIG. 2 is so prepared by the electrically conductive connection of the plug pins 12 to the wires 11 of the ribbon cable 10 that it can be embedded in a protective body. The connection of wires 11 and plug pins 12 can be effected in any standard manner. The wires 11 and the plug pins 12 are, however, preferably connected to each other at the connecting points 13 by soldering. Around the end of the ribbon cable 10 and the plug pins 12, a housing G of insulating material, shown in FIG. 4, is arranged as protective body, the housing being then attached to the cassette K.

Figure 3:
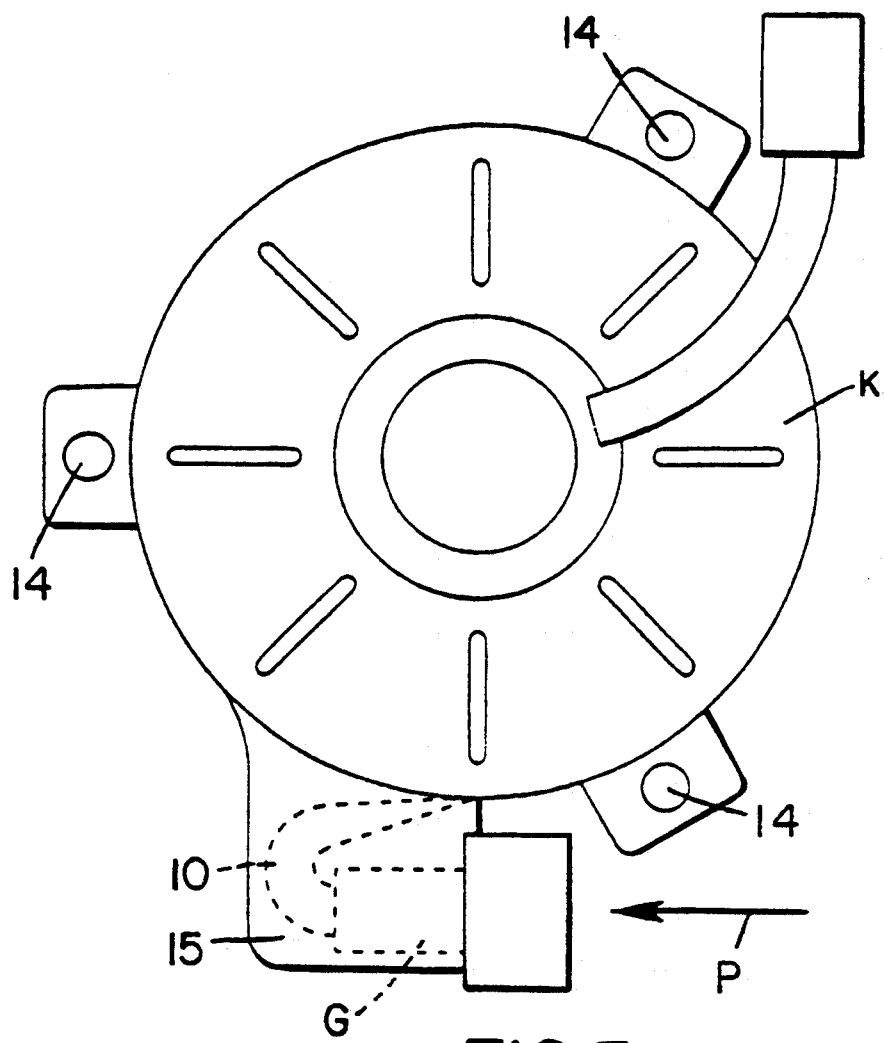
FIG. 3 is a view of a closed cassette.

The cassette K is shown in closed form in FIG. 3. It can be firmly attached by fastening points 14 to, for instance, the steering column of the steering wheel of a motor vehicle. On the cassette K there is arranged a receiver 15 within which the ribbon cable 11 which extends coiled within the cassette K ends. The housing G is placed in the receiver 15 when the end of the ribbon cable 11 and plug pins 12 are fastened in it. A connecting line can then be inserted into the receiver 15 in the direction indicated by the arrow P.

The housing G, which consists of insulating material has a base body 16 and a cover 17. The body 16 and the cover 17 may be attached to each other by a film hinge at the point 18. Base body 16 and cover 17 may, however, also be separate parts. On the cover 17 there are projections 19 which rest firmly against the plug pins 12 in the closed position of the housing G. The projections 19 protect the plug pins 12 from mechanical forces which act axially on them upon the placing on of mating contacts.

On their other side, the plug pins 12 are so fixed in the base body 16 by their shoulders, which can be noted from FIG. 2, that they are protected also against forces acting in the direction opposite the direction of insertion. Between the base body 16 and the cover 17 of the housing G a separating joint T remains at the place of closure in the embodiment shown in FIG. 4, through which joint the ribbon cable 10 is passed. The ribbon cable 10 is therefore clamped in the separating joint T in the closed position of the housing G. In this connection, it is bent twice at approximately right angles, as shown in FIG. 4. The connecting points 13 between the wires 11 and the plug pins 12 are thus also effectively relieved from strain from the side on which the ribbon cable 10 is located.

The housing G can have openings 21 and 22 in the base body 16 as well as in the cover 17 respectively, through which openings the connecting points 13 between the wires 11 of the ribbon cable 10 and the plug pins 12 are visible. The openings 21 and 22 can be used to check, or initially produce, the connecting points 13.

The housing G is produced by way of prefabrication, and may be mounted to the ribbon cable 10 as follows. The plug pins 12, already connected to the wires 11, can be pushed into the base body 16 of the housing G so that the end of the ribbon cable 10 extends out of the body 16 at the opposite end. The cover 17 is then closed, the projections 19 applying themselves firmly against the plug pins 12 or their extensions 23, and the ribbon cable 10 is clamped in the separating joint T on the other side. By the interaction of projections 19 and extensions 23, the connecting points 13 are also relieved from strain on the side on which the plug pins 12 are located. The housing G, which is thus closed, can then be inserted into the receiver 15, in which it is held engaged under spring action, for instance, by means of a nose 24.

The equipping of the housing G can also be effected in the manner that, first of all, only the plug pins 12 are inserted in it. The end of the ribbon cable 11 is then brought into the position necessary for the attachment. The housing G is then closed by means of the cover 17, the projections 19 coming against the plug pins 12, and the ribbon cable 10 being clamped in the separating joint T. The wires 11 of the ribbon cable 10 can then be soldered to the plug pins 12, which is possible through the openings 21 and 22. Since both the plug pins 12 and the ribbon cable 10 have been previously fixed in position relieved from strain, assurance is had in this manner that the connecting points 13 remain free of forces acting in axial direction.

We claim:

1. A device for transferring electric current between two end points via a ribbon cable connected between the two end points, the device comprising;
   a cassette containing the ribbon cable which extends in coiled form within the cassette, the cable having at least two electric wires the length of which is substantially greater than a distance between the two end points, at least one of the two end points being movable relative to the other;
   plug pins connected in electrically conductive manner to bared wires of the ribbon cable at at least one end;
   a prefabricated housing of insulating material with an opening to receive mating contacts, the plug pins and the end of the ribbon cable being disposed within the housing;

wherein the cassette includes a receiver with an opening, the receiver being configured for receiving the housing, the wires of the cable extending into the receiver;

the housing comprises a base body and a cover which are locked to each other in a closed position of the housing and upon an insertion of the housing into the receiver via the receiver opening;

projections are provided on the cover of the housing to serve for fixing positions of the plug pins while pressing the plug pins firmly against the base body of the housing in the closed position of the housing and thus protecting the plug pins from mechanical forces which act axially on the plug pins upon the placing on the plug pins of mating contacts, the pins extending in a direction perpendicular to said opening upon insertion of the housing into the receiver; and there is a separating joint between the base body and the cover of the housing which is opened by a movement of the cover away from the base body, and the ribbon cable passes through the separating joint to be clamped therein in the closed position of the housing, the connecting points between the wires of the ribbon cable and the plug pins thus also being relieved from strain from the side of the housing on which the ribbon cable is located.

2. A device according to claim 1, wherein the housing further comprises a film hinge; and the base body and the cover of the housing are attached to each other by the film hinge.

3. A device according to claim 2, wherein
the ribbon cable is bent at least two times in the separating joint between the base body and the cover of the housing.

4. A device according to claim 1, wherein
the ribbon cable is bent at least two times in the separating joint between the base body and the cover of the housing.

5. A device according to claim 1, where in
the plug pins have extensions against which the projections of the cover rest.

6. A device according to claim 1, wherein
the ribbon cable has connection points for connecting the plug pins to wires of the ribbon cable; and the housing has openings for providing access to the connection points lying between the wires of the ribbon cable and the plug pins.

7. A device according to claim 1, wherein
the housing is held under spring action within the receiver.

* * * * *